United States Patent
Jwa et al.

(10) Patent No.: US 10,838,612 B2
(45) Date of Patent: Nov. 17, 2020

(54) APPARATUS AND METHOD FOR PROCESSING DRAG AND DROP

(71) Applicant: Samsung Electronics Co., Ltd., Suwon-si (KR)

(72) Inventors: Changhyup Jwa, Jeju-si (KR); Kyungtae Kim, Suwon-si (KR); Hyerim Bae, Suwon-si (KR); Jungjik Lee, Suwon-si (KR); Yangwook Kim, Hwaseong-si (KR); Sunkee Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 206 days.

(21) Appl. No.: 14/819,694

(22) Filed: Aug. 6, 2015

(65) Prior Publication Data
US 2016/0048285 A1 Feb. 18, 2016

(30) Foreign Application Priority Data

Aug. 13, 2014 (KR) .................. 10-2014-0104993

(51) Int. Cl.
*G06F 3/0486* (2013.01)
*G06F 3/0484* (2013.01)
*G06F 3/0488* (2013.01)

(52) U.S. Cl.
CPC .......... *G06F 3/0486* (2013.01); *G06F 3/0488* (2013.01); *G06F 3/04842* (2013.01)

(58) Field of Classification Search
CPC .. G06F 3/0481; G06F 3/0486; G06F 3/04817; G06F 1/1616; G06F 3/0488; G06F 3/04842
See application file for complete search history.

(56) References Cited

U.S. PATENT DOCUMENTS

| 6,002,402 A * | 12/1999 | Schacher | G06F 3/0481 715/810 |
| 8,423,911 B2 | 4/2013 | Chaudhri | |
| 8,527,892 B2 * | 9/2013 | Sirpal | G06F 1/1616 715/702 |

(Continued)

FOREIGN PATENT DOCUMENTS

| CN | 1934592 A | 3/2007 |
| CN | 102541390 A | 7/2012 |

(Continued)

OTHER PUBLICATIONS

Chinese Office Action dated Aug. 22, 2019, issued in Chinese Patent Application No. 201580043391.8.

*Primary Examiner* — Andrew L Tank
(74) *Attorney, Agent, or Firm* — Jefferson IP Law, LLP

(57) ABSTRACT

An apparatus and a method for processing a drag and drop are provided. The apparatus includes a touch screen configured to display a portion of content including an object and a control module configured to identify the object as a draggable object, determine whether a predetermined touch input associated with the identified object is detected, detect whether an intended drop area associated with the identified object exists in a remaining portion of content when the predetermined touch input is detected, and display a drop area indicator corresponding to the intended drop area on the touch screen.

20 Claims, 18 Drawing Sheets

(56) References Cited

U.S. PATENT DOCUMENTS

| | | | | |
|---|---|---|---|---|
| 8,648,825 B2* | 2/2014 | Sirpal | G06F 1/1616 | 345/173 |
| 8,762,870 B2* | 6/2014 | Robotham | G06F 3/0486 | 715/769 |
| 9,213,555 B2* | 12/2015 | Poston | G06F 9/451 | |
| 2006/0048069 A1* | 3/2006 | Igeta | G06F 3/0486 | 715/769 |
| 2007/0016872 A1* | 1/2007 | Cummins | G06F 3/0486 | 715/769 |
| 2007/0188408 A1 | 8/2007 | Jarczyk | | |
| 2008/0207188 A1 | 8/2008 | Ahn et al. | | |
| 2009/0138812 A1* | 5/2009 | Ikedo | G06F 17/24 | 715/769 |
| 2009/0247112 A1* | 10/2009 | Lundy | G06F 3/0237 | 455/404.1 |
| 2009/0282353 A1 | 11/2009 | Halbherr et al. | | |
| 2009/0307589 A1 | 12/2009 | Inose et al. | | |
| 2010/0017732 A1* | 1/2010 | Matsushima | G06F 9/451 | 715/765 |
| 2010/0083154 A1 | 4/2010 | Takeshita | | |
| 2010/0295795 A1 | 11/2010 | Wilairat | | |
| 2011/0087981 A1* | 4/2011 | Jeong | G06F 3/04817 | 715/765 |
| 2012/0254793 A1* | 10/2012 | Briand | G06F 3/048 | 715/800 |
| 2012/0278727 A1 | 11/2012 | Ananthakrishnan et al. | | |
| 2013/0072263 A1* | 3/2013 | Kim | G06F 3/0488 | 455/566 |
| 2013/0117653 A1 | 5/2013 | Sukhanov et al. | | |
| 2013/0174070 A1* | 7/2013 | Briand | G06F 3/04817 | 715/769 |
| 2013/0201139 A1 | 8/2013 | Tanaka | | |
| 2014/0006949 A1* | 1/2014 | Briand | G06F 3/04817 | 715/716 |
| 2014/0040803 A1* | 2/2014 | Briand | G06F 3/0486 | 715/769 |
| 2014/0215364 A1 | 7/2014 | Kang et al. | | |
| 2014/0295958 A1* | 10/2014 | Shono | A63F 13/00 | 463/31 |

FOREIGN PATENT DOCUMENTS

| | | |
|---|---|---|
| CN | 103257812 A | 8/2013 |
| CN | 103970411 A | 8/2014 |
| EP | 2 570 906 A2 | 3/2013 |
| JP | 2010-86149 A | 4/2010 |
| KR | 10-2010-0048307 A | 5/2010 |
| WO | 2009/138559 A1 | 11/2009 |

* cited by examiner

FIG. 6C

| | EDIT | MEMO | NEW |
|---|---|---|---|
| D1 | BLOG ADDRESS tomyhis.blog.me | | 2014. 9. 28 |
| D2 | NEIGHBORHOOD - Bass Sniper | | 2014. 9. 15 |
| D3 | BANK ACCOUNT NUMBER 1002-10 | | 2014. 9. 03 |
| D4 | MG/MG7, MGX, T3 SV PRICE | | 2014. 8. 23 |
| D5 | INSADONG FAMOUS RESTAURANT | | 2014. 8. 10 |

APPARATUS AND METHOD FOR PROCESSING DRAG AND DROP

CROSS-REFERENCE TO RELATED APPLICATION(S)

This application claims the benefit under 35 U.S.C. § 119(a) of a Korean patent application filed on Aug. 13, 2014 in the Korean Intellectual Property Office and assigned Serial number 10-2014-0104993, the entire disclosure of which is hereby incorporated by reference.

TECHNICAL FIELD

The present disclosure relates to an apparatus and a method for processing a drag and drop.

BACKGROUND

Portable terminal devices provide various services such as document creation, review, and modification, photo and video editing, communication access including access to the Internet through wireless connections, or the like as well as primary services such as voice call, text message, or the like. The portable terminal may be equipped with a touch screen which integrates input and output functionality within a single element to improve user convenience.

The portable terminal may be equipped with a touch screen that provides an input functionality such as a drag and drop function which allows a user to select an object and while maintaining a touch input associated with the object, drag the object to a desired location within the touch screen, and when the input reaches the desired location, the object may be dropped by releasing the touch input. However, since a portable terminal has a reduced display area with respect to a computer monitor, it becomes difficult to perform a drag and drop function in a single action due to the size of the display.

For example, the available coordinates for dragging objects in a portable terminal display may be restricted in the horizontal direction. For example, a display area associated with the portable terminal display may be smaller than a content area to be displayed on the display screen such that in order to move an object within the interface, a drag-and-drop operation may be performed several times before the object reaches the desired location within the content area. In addition, since the size of a portable terminal display is limited, when the object is moved to a bezel area surrounding the display area, the portion of content displayed within the display area may be scrolled and the area including the desired location to drop the object may be displayed. However, touch detection within the bezel area of the display may be less accurate than within the display area of a touch screen. In addition, it may be difficult to control a scrolling speed while performing a drag-and-drop operation and the desired location area to drop the object may be passed. Furthermore, a drag-and-drop operation may be substantially similar to a touch gesture input used to interaction with a web page on a mobile web browser. Thus, it is undesirable to disable detection touch gestures associated with the interaction with a web page.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for processing a drag and drop input operation using a touch screen.

Another aspect of the present disclosure is to provide an apparatus and a method for processing a drag and drop input operation to virtually display an intended drop area outside of a current display area within the current display area when a user desires to move an object displayed in the current display area to an area outside of the current display area so that a drop operation performed within the current display area is treated as an operation where the object is dropped in the intended drop area outside of the current display area.

In accordance with an aspect of the present disclosure, an electronic apparatus is provided. The electronic apparatus includes a touch screen configured to display a portion of content including an object and a control module configured to identify the object as a draggable object, determine whether a predetermined touch input associated with the identified object is detected, determine whether an intended drop area associated with the identified object exists in a remaining portion of content when the predetermined touch input is detected, and display a drop area indicator corresponding to the intended drop area on the touch screen.

In accordance with another aspect of the present disclosure, a method of processing a drag and drop in an electronic apparatus having a touch screen is provided. The method includes displaying a portion of content including an object on the touch screen, identifying the object as a draggable object, determining whether a predetermined touch input associated with the identified object is detected, determining whether an intended drop area associated with the identified object exists in a remaining portion of content when the predetermined touch input is detected, and displaying a drop area indicator corresponding to the intended drop area on the touch screen.

According to various embodiments of the present disclosure, user convenience may be enhanced by processing a drag and drop in a touch screen efficiently.

According to various embodiments of the present disclosure, a drop area to drop may be virtually displayed in a display area when a user desires to drop an object displayed in the display area to the outside of the display area, so that a drop may be treated identically with an actual drop to the outside of the display area by just only dropping in the drop area displayed in the display area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, and 6C illustrate examples of displaying a draggable object discriminatively according to various embodiments of the present disclosure;

Throughout the drawings, like reference numerals will be understood to refer to like parts, components, and structures.

DETAILED DESCRIPTION

Figure 1:
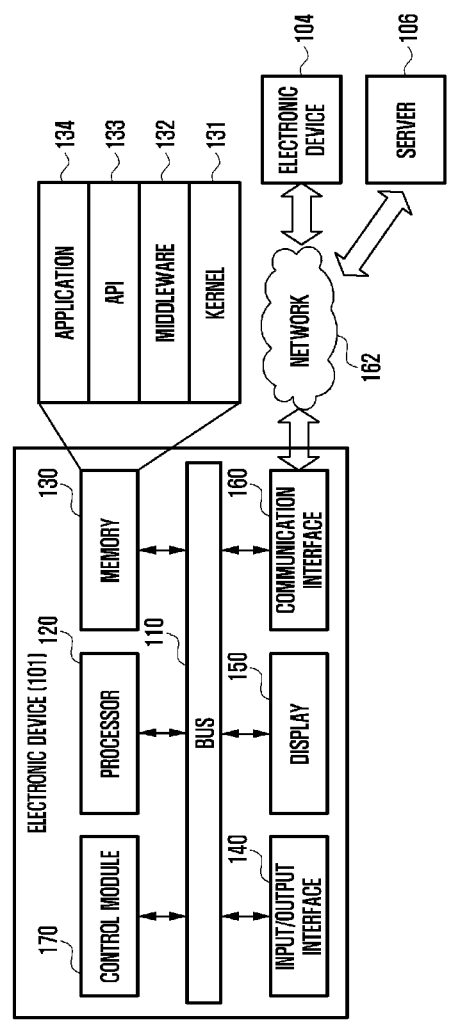
FIG. 1 is a diagram illustrating a network environment including an electronic apparatus according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include" or "includes" which may be used in describing various embodiments of the present disclosure refer to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

In various embodiments of the present disclosure, the expressions "or" or "at least one of A or/and B" include any or all of combinations of words listed together. For example, the expression "A or B" or "at least A or/and B" includes A, includes B, or includes both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both are user devices. For example, without departing from the scope of the present disclosure, a first structural element may be referred to as a second structural element, and the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment and do not limit the various embodiments of the present disclosure.

Unless defined differently, all terms used herein, which include technical terminologies or scientific terminologies, have the same meaning as that understood by a person skilled in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in the present description.

An electronic device according to various embodiments of the present disclosure may include a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, and a wearable device such as a head-mounted-device (HMD) including electronic glasses, electronic clothes, and electronic bracelet, an electronic necklace, an electronic appcessory, an electronic tattoo, and a smart watch.

According to various embodiments of the present disclosure, the electronic device may be a smart home appliance having a communication function. The smart home appliance includes at least one of a television (TV), a digital versatile disc (DVD) player, an audio player, an air conditioner, a cleaner, an oven, a microwave oven, a washing machine, an air cleaner, a set-top box, a TV box such as SAMSUNG HOMESYNC, APPLE TV, or GOOGLE, game consoles, an electronic dictionary, an electronic key, a camcorder, and an electronic frame.

According to various embodiments of the present disclosure, the electronic device may include at least one of various types of medical devices such as magnetic resonance angiography (MRA), magnetic resonance imaging (MRI), computed tomography (CT), a scanner, an ultrasonic device and the like), a navigation device, a global positioning system (GPS) receiver, an event data recorder (EDR), a flight data recorder (FDR), a vehicle infotainment device, electronic equipment for a ship such as a navigation device or a gyro compass, avionics, a security device, a head unit for a vehicle, an industrial or home robot, an automatic teller machine (ATM) of financial institutions, and a point of sale (POS) device of shops.

According to various embodiments of the present disclosure, the electronic device may include at least one of furniture or a part of a building/structure, an electronic board, an electronic signature receiving device, a projector, and various types of measuring devices such as a water meter, an electricity meter, a gas meter, and a radio wave meter including a communication function. The electronic device according to various embodiments of the present disclosure may be one or a combination of the above-described various devices, and may be a flexible device. It is apparent to those skilled in the art that the electronic device according to various embodiments of the present disclosure is not limited to the above-described devices.

Hereinafter, the term "user" used in various embodiments of the present disclosure may refer to a person who uses the electronic device or a device such as an artificial intelligence device which uses an electronic device.

FIG. 1 illustrates a network environment including an electronic device according to various embodiments of the present disclosure.

Referring to FIG. 1, the electronic device 101 includes a bus 110, a processor 120, a memory 130, an input/output interface 140, a display 150, a communication interface 160, and a control module 170.

The bus 110 is a circuit connecting and transmitting communication between the above-described components.

The processor 120 receives commands from other components of the electronic device 101 such as the memory 130, the input/output interface 140, the display 150, the communication interface 160, and/or the control module 170 through the bus 110, analyzes the received commands, and executes calculation or data processing according to the analyzed commands.

The memory 130 stores commands or data received from or generated by the processor 120 or other components of the electronic device 101. The memory 130 includes a kernel 131, middleware 132, an application programming interface (API) 133, and an application 134. Each of the aforementioned programming modules may be implemented by software, firmware, hardware, or a combination thereof.

The kernel 131 controls or manages system resources such as the bus 110, the processor 120, and/or the memory 130 used for executing an operation or function implemented by the other programming modules. The kernel 131 provides an interface for accessing individual components of the electronic device 101 from the middleware 132, the API 133, and/or the application 134 to control or manage the components.

The middleware 132 performs a relay function of allowing the API 133 or the application 134 to communicate with the kernel 131 to exchange data. In operation requests received from the application 134, the middleware 132 performs a control for the operation requests, such as scheduling or load balancing, by assigning a priority by which system resources of the electronic device 101 can be used, to the application 134.

The API 133 is an interface by which the application 134 can control a function provided by the kernel 131 or the middleware 132 and includes, for example, at least one interface or function for a file control, window control, image processing, or character control.

According to various embodiments of the present disclosure, the application 134 includes a short message service (SMS)/multimedia messaging service (MMS), email, calendar, alarm application, health care such as for measuring quantity of exercise or blood sugar, or environment information application such as for providing information on barometric pressure, humidity or temperature. Additionally or alternatively, the application 134 may be related to an information exchange between the electronic device 101 and an external electronic device 104, such as a notification relay application for transferring particular information to the external electronic device or a device management application for managing the external electronic device.

For example, the notification relay application includes a function of transmitting notification information generated by another application of the electronic device 101 to the external electronic device 104. Additionally or alternatively, the notification relay application receives notification information from, for example, the external electronic device 104 and provides the received notification information to the user. The device management application manages at least a part of the functions of the external electronic device 104 communicating with the electronic device 101, an application executed in the external electronic device 104, and a service such as call or message service provided by the external electronic device 104.

According to various embodiments of the present disclosure, the application 134 is designated according to an attribute or type of the external electronic device 104. For example, when the external electronic device 104 is an MP3 player, the application 134 is related to music reproduction. Similarly, when the external electronic device 104 is a mobile medical device, the application 134 is related to health care. According to an embodiment of the present disclosure, the application 134 includes at least one of an application designated to the electronic device 101 and an application received from an external electronic device, such as the server 106 or electronic device 104.

The input/output interface 140 transmits a command or data input from the user through an input/output device such as a sensor, keyboard, or touch screen to the processor 120, the memory 130, the communication interface 160, or the control module 170 through the bus 110. For example, the input/output interface 140 provides data on a user's touch input through a touch screen to the processor 120, and outputs a command or data received, through the bus 110, from the processor 120, the memory 130, the communication interface 160, or the control module 170 through the input/output device such as a speaker or a display.

The display 150 displays various pieces of information to the user.

The communication interface 160 connects communication between the electronic device 101 and the external device. For example, the communication interface 160 accesses a network 162 through wireless or wired communication to communicate with the external device. The wireless communication includes at least one of, for example, Wi-Fi, BLUETOOTH (BT), near field communication (NFC), a GPS, and cellular communication such as long term evolution (LTE), LTE-advanced (LTE-A), code division multiple access (CDMA), wideband CDMA (WCDMA), universal mobile telecommunications service (UMTS), wireless broadband (WiBro) or global system for mobile communications (GSM). The wired communication includes at least one of a universal serial bus (USB), a high definition multimedia interface (HDMI), recommended standard 232 (RS-232), and a plain old telephone service (POTS).

According to an embodiment of the present disclosure, the network 162 is a telecommunication network including at least one of a computer network, Internet, Internet of things, and a telephone network. A protocol such as transport layer, data link layer, or physical layer protocol for communication between the electronic device 101 and the external device may be supported by at least one of the application 134, the API 133, the middleware 132, the kernel 131, and the communication interface 160.

While illustrated in FIG. 1 as two separate elements of the electronic device 101, the input/output interface 140 and the display 150 may be integrally formed within a single device such as a touch screen.

The control module 170 may be configured to control the display 150 to display a portion of content within a display area of the display 150. In an exemplary embodiment, an area associated with the entire content configured to be displayed on the display 150 may be greater than the display area of the display 150. The portion of content displayed within the display area of the display 150 may include an object on the touch screen. The control module 170 may identify that the object is capable of being relocated within the content area. For example, the position of the object within the display area may be modified using a drag-and-drop operation where the object may be relocated to a portion of the content area not currently within the display area of the display 150. In this case, the display 150 of the touch screen displays only a portion of content within the display area and a remaining content is not currently visible within the display area of the display 150. However, the content area not currently displayed in the display area of the display 150 may be accessed using various techniques such as scrolling. The control module 170 may identify an object capable of being relocated within the content area different from an object not capable of being relocated with the content area based on the portion of the content currently displayed within the display area on the touch screen of the display 150. In this case, the control module 170 may classify an object capable of being relocated within the content area different from an object not capable of being relocated with the content area such that an object capable of being relocated within the content area may be distinguished from an object not capable of being relocated within the content area. The control module 170 may determine whether a predetermined touch input associated with an identified object is detected. Hereinafter, the identified object means an object capable of being relocated within a content area (e.g., a draggable object).

According to various embodiments of the present disclosure, the control module 170 may be configured to determine whether the detected touch input associated with the identified object is maintained for a predetermined time, determine whether the touch input is dragged more than a predetermined distance when the touch input is maintained for the predetermined time, and determine that the predetermined touch input is detected when the touch input is dragged more than the predetermined distance. The control module 170 may provide an indicator that is displayed with the display area of the display 150 that indicates the identified object can be dragged within the content area when the touch input detected on the identified object is maintained for the predetermined time and an input associated with a drag operation is not detected. The control module 170 may determine whether the detected touch input associated with the identified object is maintained for a predetermined time, determine whether the touch input is dragged over the display 150 at a predetermined speed when the touch input is maintained for the predetermined time, and determine that the detected touch input has been maintained for the predetermined time when the touch input is dragged over the display 150 at the predetermined speed.

When touch input is detected, the control module 170 may determine whether an area to which the identified object can be dropped exists in the content area not currently displayed within the display area of the display 150 and control the display 150 to display the intended drop area corresponding to the detected area associated with the content area not currently displayed within the display area on the touch screen. Alternatively, the control module 170 may display a path from the identified object associated with the detected touch input to the detected area on the touch screen as a guide line.

According to various embodiments of the present disclosure, the control module 170 may determine at least one of a number, a location, and a size of the intended drop area of the content, and may adjust at least one of a number, a location, and a size of a drop area indicator so as to correspond to at least one of the determined number, location, and size and display the adjusted drop indicators on the touch screen. When the detected touch input associated with the identified object is dragged to the drop area indicator, the amount of content area displayed within the touch screen may be increased to display a greater amount of content area including the intended drop area in which the object is to be dragged. For example, when the current portion of the content does not include the intended drop area, the amount of content displayed within the display area of the display 150 may be increased (e.g., by zooming out) such that the intended drop area not previously displayed within the display area is included within the display area. When the detected touch input associated with the identified object is dragged to the intended drop area, the control module 170 may control a portion of the content area corresponding to the intended drop area to be within the display area of the display 150 and display content corresponding to the intended drop area within the display area of the touch screen. When the detected touch input associated with the identified object is dragged to the drop area indicator, the control module 170 may control the display 150 to display content corresponding to the intended drop area such that the content corresponding to the intended drop area is overlapped with the portion of the content currently displayed within the display area of the touch screen. When a number of the drop area indicators is equal or greater than a predetermined number, the control module 170 may display the remaining portion of content corresponding to the intended drop area to overlap with the currently content displayed on the touch screen. When the detected touch input associated with the identified object is dragged to an area of the content that is an area not associated with a drop area indicator, the control module 170 may remove the drop area indicator from within the display area of the touch screen such that the drop area indicator may no longer be visible to a user within the display area of the touch screen.

Figure 2:
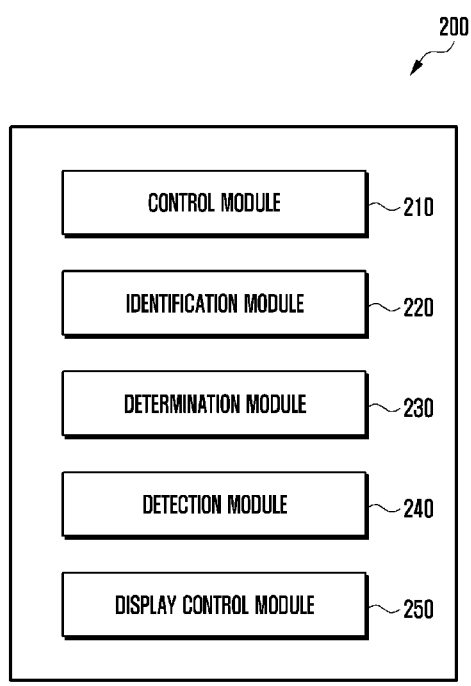
FIG. 2 is a block diagram illustrating an electronic apparatus according to various embodiments of the present disclosure.

FIG. 2 is a block diagram illustrating an electronic apparatus according to various embodiments of the present disclosure.

Referring to FIG. 2, the electronic apparatus 200 may include a control module 210, an identification module 220, a determination module 230, a detection module 240, and a display control module 250.

The display control module 250 may be configured to control a display device to display a portion of content including an object within a display area of the touch screen. In an exemplary embodiment, display control module 250 may be integrated with control module 170. Alternatively, display control module 250 may be completely separate from control module 170. In addition, display control module 250 may be configured to control display device 150 to display a portion of the content including an object. The content may include multimedia data, an application including at least one of text, video, or audio, etc. The object may include an object capable of being relocated within a content area (e.g., draggable object) or an object not capable of being relocated with a content area (e.g., a non-draggable object). In an exemplary embodiment, a draggable object may modify the content after being relocated to a different portion of content area. In another exemplary embodiment, the display control module 250 may be further configured to display the draggable object and the non-draggable object such that a user may visually distinguish between the draggable object and the non-draggable object.

The portion of content displayed within a display area of a display may be less than a content area associated with the content. For example, the content may be divided into at least two or more portions due to a limitation of the size of the display area of the display. When the content area exceeds the size of the display area, any portion of the content may be displayed within the display area of the touch screen and the remaining portions of content may not be displayed within the display area of the touch screen. However, the remaining portion of content which is not displayed on the touch screen may be accessed and displayed on the touch screen according to a user's movement instruction such as a drag, a scroll, or the like.

In an exemplary embodiment, the content displayed within the display area of the touch screen may be a portion of content or a portion of the content area and the content not displayed within the display area of the touch screen may be a remaining portion of content or a remaining portion of the content area. The content may include at least one object including a draggable object or a non-draggable object. In addition, the content may include an intended area for dropping a dragged object. A draggable object, a non-draggable object, and/or an intended area for dropping the dragged object may be associated with the portion of the content currently displayed within the display area of a display or the remaining portion of content not currently displayed within the display area of a display.

According to an embodiment of the present disclosure, the display control module 250 may be configured to control the display of a display device such that that an identified object is draggable when the detected touch input associated with the identified object is maintained for a predetermined time and the drag touch input is not detected. A visual indicator may indicate that the object is draggable in various directions such as up, down, left, right. For example, the display control module 250 may be configured to control the portion of the content displayed in the display area using up, down, left, and right arrow icons to indicate a potential navigation direction within the content area.

In various embodiments of the present disclosure, when a touch input associated with a draggable object is detected indicating that the draggable object is dragged to an intended drop area, the display control module 250 may be configured to control a display device such that a portion of the content area surrounding the draggable object is enlarged. In addition, the display control module 250 may be further configured to control a display device such that an area surrounding the intended drop area is enlarged. For example, by enlarging the content area surrounding the draggable object and/or enlarging the content area surrounding the intended drop area, a user may visually distinguish the draggable object and/or the intended drop area from other portions of the content.

In various embodiments of the present disclosure, the display control module 250 may be further configured to control a display device such that the remaining portion of content corresponding to the intended drop area is displayed within the display area of the touch screen. For example, the portion of the content currently displayed within the display area may be moved outside the display area so it is no longer visible when the remaining portion of the content corresponding to the intended drop area is displayed within the display area. Alternatively, the display control module 250 may be configured to control a display device such that the remaining portion of content corresponding to the intended drop area is displayed to overlap the portion of the content currently displayed within the display area of the touch screen. In an exemplary embodiment, when the number of the displayed drop area is equal to or greater than a predetermined number of intended drop areas, the display control module 250 may control the display device to display the remaining portion of content corresponding to the drop area to overlap the touch screen. When the touch input associated with the object is dragged to the area which is not associated with the drop area indicator, the display control module 250 may remove the drop area indicator from the touch screen. That is, the drop area indicator displayed on the touch screen may disappear from a user perspective.

The display control module 250 may display the drop area corresponding to the remaining portion of content on the touch screen. When the user drops the object in the drop area displayed on the touch screen, the control module 210 may treat the object with the same process of dropping in the remaining portion of content. The display control module 250 may display a path from the object in which the touch input is detected to the intended drop area on the touch screen as a guide line. The user may drag the object to the intended drop area by dragging the touch input along the guide line.

The identification module 220 may be configured to identify the draggable object from among a plurality of objects displayed on the touch screen. The identification module 220 may be configured to identify that the object is capable of being relocated within the content area where the object may be dragged from a portion of the content currently displayed within the display area to a portion of the remaining content not currently displayed within the display area of the touch screen. In an embodiment of the present disclosure, the identification module 220 may identify an object as a draggable object based on the type of content. The identification module 220 may be further configured to classify an object as a draggable object or a non-draggable object before the object is displayed within the display area of the touch screen or after the object is displayed within the display area of the touch screen.

The determination module 230 may be configured to determine whether a detected touch input is associated with the identified object. The touch input may be a predetermined touch input previously set by a user or the electronic apparatus 200. For example, the determination module 230 may be configured to define a drag-and-drop input pattern or a flicking input pattern as the predetermined touch input. The determination module 230 may be further configured to determine whether the touch input associated with the identified object is maintained for a predetermined time. When it is determined that the touch input is maintained for the predetermined time, the determination module 230 may determine whether the touch input pattern indicates that the object is dragged more than a predetermined distance. When it is determined that the touch input is dragged more than the predetermined distance, the determination module 230 may determine that the detected touch input is the predetermined touch input. The predetermined time may be used to determine whether the touch input is an input of long press, e.g., the time in which the touch input is detected exceeds two seconds. The predetermined distance may be based on the size or the area of the touch screen. For example, the predetermined distance may be in the range of 2-5 cm. In an exemplary embodiment, a first predetermined distance such as 2-3 cm may be associated with a first touch screen and a second predetermined distance such as 3-5 cm may be associated with a second touch screen where the size or area of the second touch screen is greater than the size or area of the first touch screen.

In an embodiment of the present disclosure, when the touch input is maintained for the predetermined time, the determination module 230 may be configured to determine whether the touch input is dragged more than a predetermined speed and determine that the touch input is the predetermined touch input when the detected touch input is dragged more than the predetermined speed. The predetermined speed may be based on the touch input speed associated with a flicking input pattern. When the predetermined touch input is detected, the detection module 240 may be configured to detect whether an area in which the identified object is intended to be dropped exists in the remaining portion of content. In various embodiments of the present disclosure, the detection module 240 may determine at least one of a number, a location, and a size of the intended drop area. The detection module 240 may adjust at least one of a number, a location, and a size of the intended drop area so as to correspond to at least one of the determined number, location, and size.

The electronic apparatus according to various embodiments of the present disclosure may include a touch screen configured to display a portion of content including an object and a control module configured to identify the object as a draggable object, determine whether a predetermined touch input associated with the identified object is detected, determine whether an intended drop area associated with the identified object exists in a remaining portion of content when the predetermined touch input is detected, and display a drop area indicator corresponding to the intended drop area on the touch screen.

The control module identifies an object that can be dragged to the remaining portion of content deviated from the touch screen from among a plurality of objects displayed on the touch screen.

The control module identifies a draggable object differently depending on the type of content displayed.

The control module determines whether the touch input associated with the identified object is maintained for a predetermined time, determines whether the touch input is dragged more than a predetermined distance when the touch input is maintained for the predetermined time, and determines that the predetermined touch input is detected when the touch input is dragged more than the predetermined distance.

The control module displays that the identified object can be dragged when the touch input detected on the identified object is maintained for the predetermined time and the drag of the touch input is not detected.

The control module determines whether the touch input associated with the identified object is maintained for a predetermined time, determines whether the touch input is dragged over a predetermined speed when the touch input is maintained for the predetermined time, and determines that the predetermined touch input is detected when the touch input is dragged over the predetermined speed.

The control module controls to identify a non-draggable object displayed on the touch screen and displays the draggable object to be distinguished from the non-draggable object.

The control module controls to determine at least one of a number, a location, and a size of an intended drop area and adjusts at least one of a number, a location, and a size of the drop area indicators so as to correspond to at least one of the determined number, location, and size of the intended drop area, and displays the adjusted drop area indicators on the touch screen.

The control module may display a path from the object in which the touch input is detected to the intended drop area on the touch screen as a guide line.

The touch screen enlarges and displays a size of the intended drop area to which the object is dragged when the touch input associated with the object is dragged to the drop area indicator.

The control module controls to move the remaining portion of content corresponding to the intended drop area when the touch input detected on the object is dragged to the drop area indicator and displays the remaining portion of content corresponding to the intended drop area on the touch screen.

The control module controls to display the remaining portion of content corresponding to the intended drop area to overlap with the touch screen when the touch input associated with the object is dragged to the drop area indicator.

The control module controls to display the remaining portion of content corresponding to the intended drop area to overlap with the touch screen when the number of the drop area indicators is more than a predetermined number.

The control module controls to remove the drop area indicator from the touch screen when the touch input associated with the object is dragged to an area which is not associated with the drop area indicator.

Figure 3:
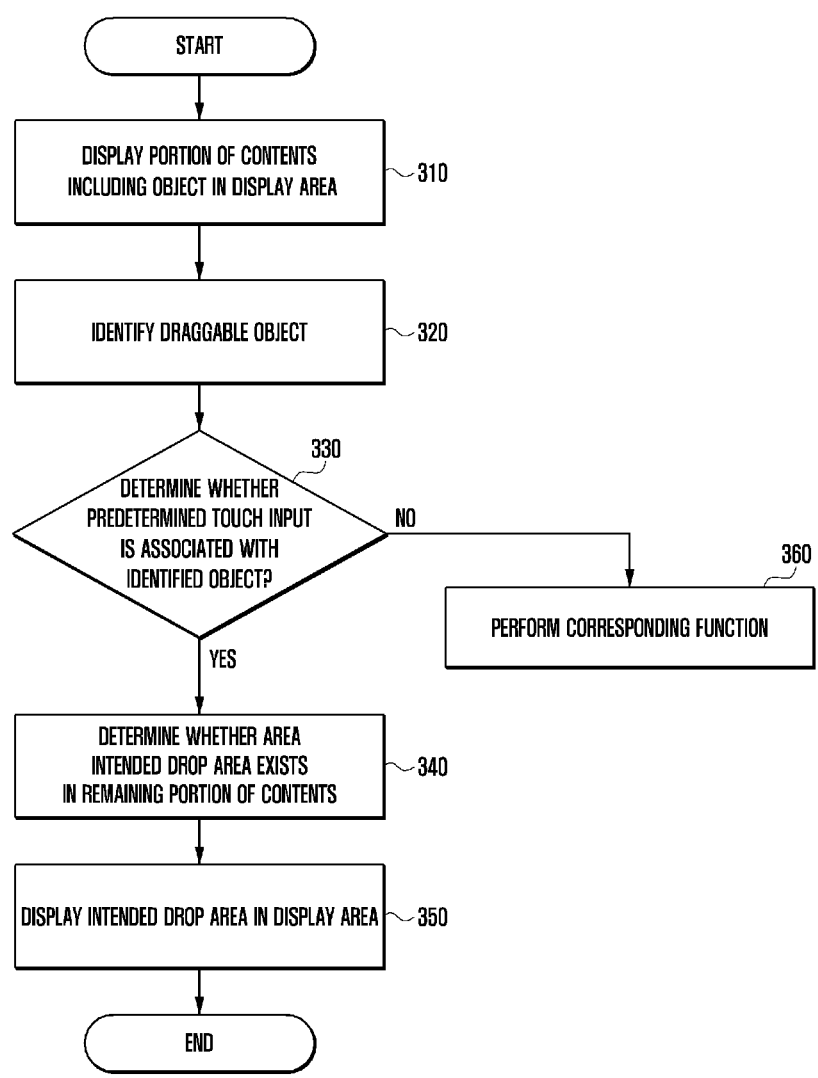
FIG. 3 is a flowchart illustrating a method of processing a drag and drop according to various embodiments of the present disclosure.

FIG. 3 illustrates a flow chart of an exemplary method of processing a drag and drop input according to various embodiments of the present disclosure. The method will be discussed with reference to the exemplary electronic apparatus 101 illustrated in FIG. 1 or the exemplary electronic apparatus 200 illustrated in FIG. 2. However, the method can be implemented with any suitable electronic apparatus. In addition, although FIG. 3 depicts steps performed in a particular order for purposes of illustration and discussion, the methods discussed herein are not limited to any particular order or arrangement. One skilled in the art, using disclosures provided herein, will appreciate that various steps of the methods can be omitted, rearranged, combined and/or adapted in various ways.

Referring to FIG. 3, at operation 310, a portion of content including an object may be displayed within a display area of a touch screen. For example, the display control module 250 may be configured to control a display device such as display 150 to display a portion of content within a display area of the touch screen associated with the display device. The content may include multimedia data, an application including at least one of text, video, or audio, etc. For example, when the content is a web page, the web page may be displayed on a large display apparatus such as a full size monitor connected to a laptop or desk top computer where a user may view the entire content area of the web page on the display device. However, due to the size of the display screen associated with the electronic apparatus 101 or 200, the same web page may not be fully displayed within the display area of the display device of the electronic apparatus 101 or 200 and only a portion of the web page may be viewed within the display area of the touch screen. The remaining portion of the web page which is not visible within the display area of the touch screen may be displayed within the display area of the touch screen based on a touch input received at the touch screen such as a drag, a scroll, or the like. The content may include one or more objects and an object may a draggable object or a non-draggable object. For example, when the object is an image, the image may be draggable or non-draggable. In an exemplary embodiment, a draggable object may modify the content after being relocated to a different portion of content area. In addition, the type of touch input may be different depending on the type of content displayed within the display area.

At operation 320, a draggable object may be identified. For example, the electronic apparatus 101 or 200 may identify whether or not the object displayed within a display area can be dragged to a remaining portion of content. In an embodiment of the present disclosure, identification module 220 may identify the draggable object based on the type of content displayed within the display area of a touch screen. When the electronic apparatus 101 or 200 identifies whether the object is a draggable object or a non-draggable object, the electronic apparatus 101 or 200 may be configured to control the touch screen to display the draggable object differently from a non-draggable object. For example, the electronic apparatus 101 or 200 may be configured to control the touch screen such that a draggable object may be visually distinguishable from a non-draggable object. For example, the touch screen may display the draggable object more prominently than the non-draggable object. The edge of the draggable object may be colored, for example, in red, blue, and the like or the draggable object may be flickered. Thus, the user may visually distinguish between the draggable object and the non-draggable object.

At operation 330, whether a predetermined touch input associated with an identified object may be determined. For example, electronic apparatus 101 or 200 may determine whether a predetermined touch input is associated with an identified object is detected. The predetermined touch input may be previously set by a user or the electronic apparatus 200. For example, the predetermined touch input may be a drag and drop input pattern or a flicking input pattern. In various embodiments of the present disclosure, the electronic apparatus 101 or 200 may determine whether the detected touch input associated with the identified object is maintained for a predetermined time. The predetermined time may be used to determine whether the touch input is a long press, e.g., the time in which the touch input is detected exceeds two seconds. When the touch input is maintained for the predetermined time, the electronic apparatus 101 or 200 may determine whether the touch input is dragged more than a predetermined distance and may determine that the predetermined touch input is detected when the touch input is dragged more than the predetermined distance. The predetermined distance may be based on the size or the area of the touch screen. For example, the predetermined distance may be in the range of 2-5 cm. In an exemplary embodiment, a first predetermined distance such as 2-3 cm may be associated with a first touch screen and a second predetermined distance such as 3-5 cm may be associated with a second touch screen where the size or area of the second touch screen is greater than the size or area of the first touch screen.

In various embodiments of the present disclosure, the electronic apparatus 101 or 200 may be configured to control a display device such that the identified object is draggable from a first portion of content to a second portion of content when the detected touch input associated with the object is maintained for a predetermined time and the drag of the touch input is not detected. In an exemplary embodiment, to indicate that the object can be moved in an up, down, left, or right direction, the display control module 250 may control the display to include indicators such as up, down, left, right arrows respectively.

In various embodiments of the present disclosure, the electronic apparatus 101 or 200 may determine whether a touch input is maintained for the predetermined time, whether the touch input is dragged more than a predetermined speed, and that the predetermined touch input is detected when the touch input is dragged more than the predetermined speed. The predetermined speed may be based on the input speed associated with a flicking input operation.

When the predetermined touch input is detected, it can be determined whether an intended drop area exists in a remaining portion of content at operation 340. For example, the electronic apparatus 101 or 200 may detect whether an area in which the identified object is intended to be dropped exists in the remaining portion of content. The intended area in which the identified object can be dropped is an area of the content in which the dragged object can be dropped and may be detected in the remaining portion of content. When the predetermined touch input is not detected (e.g., the touch input is determined not to be the predetermined touch input), the electronic apparatus 101 or 200 may perform a function corresponding to the detected touch input at operation 360.

At operation 350, the intended drop area may be displayed in the display area. For example, the electronic apparatus 101 or 200 may display an area of content corresponding to an intended drop area within the display area of the touch screen. The intended drop area may correspond to the area detected from the remaining portion of content and may be displayed on the touch screen for user convenience. When an input indicative of dropping the object in the intended drop area displayed on the touch screen is detected, the electronic apparatus 101 or 200 may treat the object with the same process of dropping in the remaining portion of content. The electronic apparatus 101 or 200 may display a path from the object in which the touch input is detected to the intended drop area on the touch screen as a guide line where the user may drag the object to the intended drop area conveniently by dragging the touch input along the guide line.

In various embodiments of the present disclosure, the electronic apparatus 101 or 200 may determine at least one of a number, a location, and a size of the intended drop area and may adjust at least one of a number, a location, and a size of a drop area indicator so as to correspond to at least one of the determined number, location, and size of the intended drop area and display the adjusted drop area indicator on the touch screen. For example, the electronic apparatus may display three drop area indicators on the touch screen when the number of intended drop areas is three. The electronic apparatus may extract the location of the intended drop area into a coordinate value and may change the location of the drop area indicator so as to correspond to the coordinate value associated with the intended drop area. The electronic apparatus may adjust the size of the drop area indicator to be enlarged when the size of the intended drop area is large and may adjust the size of the drop area indicator to be reduced when the size of the intended drop area is small.

The method of processing a drag and drop touch input according to various embodiments of the present disclosure includes displaying a portion of content including an object on the touch screen, identifying a draggable object among the object, determining whether a predetermined touch input associated with the identified object is detected, determining whether an intended drop area associated with the identified object exists in a remaining portion of content when the predetermined touch input is detected, and displaying a drop area indicator corresponding to the intended drop area on the touch screen.

Identifying a draggable object includes identifying an object that can be dragged to the remaining portion of content not displayed on the touch screen from among the object displayed on the touch screen.

Determining whether a predetermined touch input is detected includes determining whether the detected touch input associated with the identified object is maintained for a predetermined time, determining whether the touch input is dragged more than a predetermined distance when the touch input is maintained for the predetermined time, and determining that the predetermined touch input is detected when the touch input is dragged more than the predetermined distance.

Determining whether a predetermined touch input is detected includes displaying a visual indicator that the identified object can be dragged when the touch input detected on the identified object is maintained for the predetermined time and the drag of the touch input is not detected.

Determining whether a predetermined touch input is detected includes: determining whether the detected touch input associated with the identified object is maintained for a predetermined time, determining whether the touch input is dragged over a predetermined speed when the touch input is maintained for the predetermined time, and determining that the predetermined touch input is detected when the touch input is dragged over the predetermined speed.

Determining whether a predetermined touch input is detected includes: identifying a non-draggable object displayed on the touch screen and displaying the draggable object to be distinguished from the non-draggable object.

Determining whether an area in which the identified object can be dropped exists includes checking at least one of a number, a location, and a size of an intended drop area. Displaying a drop area indicator corresponding to the intended drop area includes adjusting at least one of the number, the location, and the size of the drop area indicator so as to correspond to at least one of the determined number, location, and size of the intended drop area and displaying the adjusted drop area indicator on the touch screen.

Displaying of the drop area indicator includes displaying a path from the object in which the touch input is detected to the intended drop area on the touch screen as a guide line.

The method further includes enlarging and displaying a size of the intended drop area in which the object is dragged when the touch input associated with the object is dragged to the drop area indicator.

The method further includes moving to the remaining portion of content corresponding to the intended drop area when the touch input associated with the object is dragged to the drop area indicator and displaying the remaining portion of content corresponding to the intended drop area on the touch screen.

The method further includes displaying the remaining portion of content corresponding to the intended drop area to overlap with the touch screen when the touch input associated with the object is dragged to the drop area indicator.

Displaying of the drop area indicator includes displaying the remaining portion of content corresponding to the drop area to overlap with the touch screen when a number of the drop area indicators is more than a predetermined number.

The method further includes removing a drop area indicator from the touch screen when the touch input associated with the object is dragged to an area which is not associated the drop area indicator.

Figure 4A:
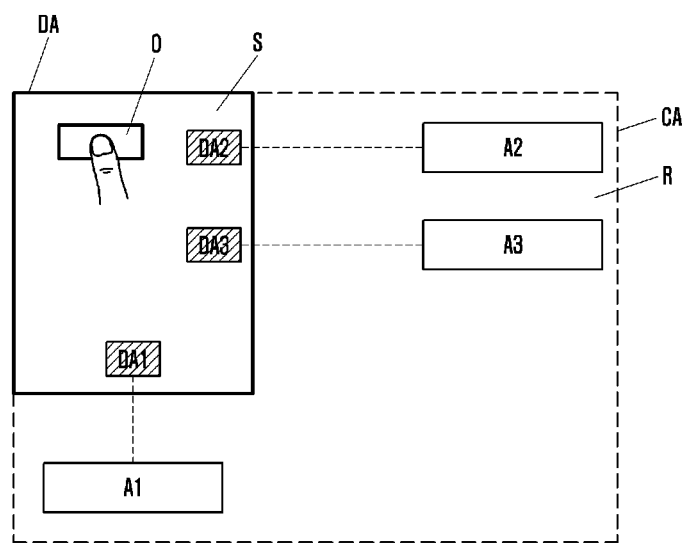
FIGS. 4A and 4B illustrate examples of displaying a drop area in a touch screen according to various embodiments of the present disclosure.
Figure 4B:
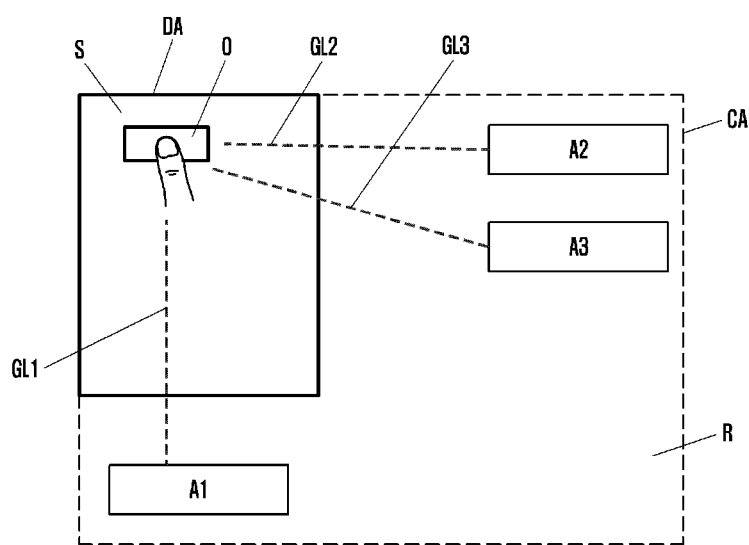

FIGS. 4A and 4B illustrate examples of displaying a drop area in a touch screen according to various embodiments of the present disclosure.

Referring to FIG. 4A, a rectangular area illustrated as 'CA' may form a single content area. For example, it is desirable for the entire content area CA to be displayed on a single screen at the same time. However, due to the limitation of the size of the display screen, an electronic apparatus may display only a portion of content within a display area DA of a touch screen. The portion of content displayed in the display area DA of the touch screen is illustrated as 'S' and the remaining portion of content not displayed within the display area DA of the touch screen is illustrated as 'R'. When the portion of content S is displayed within the display area DA of the touch screen, the remaining portion R of the content is not displayed on the touch screen. However, if an input such as a drag, a scroll, or the like is detected, the portion of content R may be displayed on the touch screen.

The electronic apparatus may identify an object 'O' within the portion of content S displayed in the display area DA. The electronic apparatus may identify whether the object O is a draggable object or a non-draggable object. When the object O is a draggable object, the electronic apparatus may determine whether a predetermined touch input associated with the object O is detected. When the predetermined touch input is detected, the electronic apparatus may determine whether an area to which the object O is intended to be dropped exists in the remaining portion R of content. For example, the electronic apparatus may detect intended areas A1 to A3, as areas in which the object O is intended be dropped within the remaining portion R of the content area CA. The electronic apparatus may display a drop area indicator corresponding to the intended drop areas (A1 to A3). For example, referring to FIG. 4A, the electronic apparatus may display a first drop area indicator as DA1 where DA1 corresponds to the intended drop area A1, a second drop area indicator as DA2 where DA2 corresponds to the intended drop area A2, and a third drop area indicator DA3 where DA3 corresponds to the intended drop area A3. It is noted that while FIG. 4A illustrates three intended drop areas and three corresponding drop area indicators, any number of intended drop areas and/or drop area indicators may be provided.

Referring to FIG. 4B, the electronic apparatus may determine whether a predetermined touch input associated with the object O is detected when the object O is a draggable object. When the predetermined touch input associated with the object O is detected, the electronic apparatus may determine whether an area to which the identified object O may be dropped exists in the remaining portion R of content. The electronic apparatus may display a path from the object O in which the touch input is detected to the intended drop areas (A1 to A3) in the remaining portion R of content as a guide line (GL1 to GL3) on the touch screen. For example, the electronic apparatus may display a first guide line GL1 from the object O to the intended drop area A1, a second guide line GL2 from the object O to the intended drop area A2, and a third guide line GL3 from the object O to the intended drop area A3.

Figure 5A:
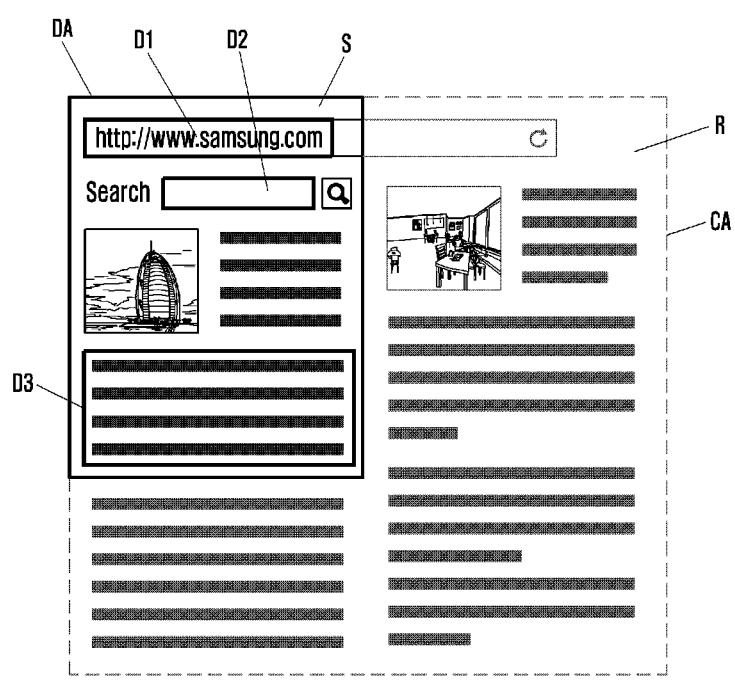
FIGS. 5A, 5B, and 5C illustrate examples of identifying a draggable object according to various embodiments of the present disclosure.
Figure 5B:
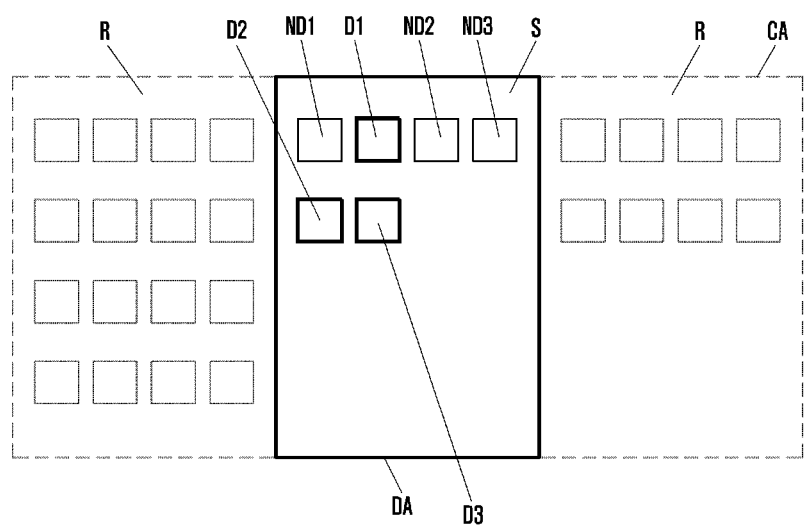
Figure 5C:
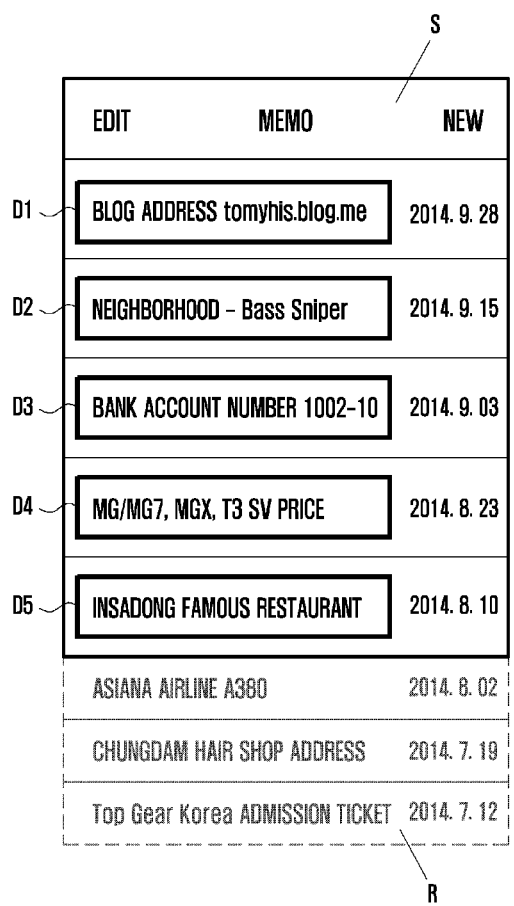

FIGS. 5A to 5C illustrate examples of identifying a draggable object according to various embodiments of the present disclosure.

FIG. 5A illustrates an example of displaying a web page as content.

Referring to FIG. 5A, the entire web page is the content area CA and only a portion of the web page S may be displayed within the display area DA of the touch screen at one time where the remaining portion of the web page R cannot be displayed within the display area DA of the touch screen. The electronic apparatus may identify an object as a draggable object associated with the content displayed within the display area DA of the touch screen. For example, the electronic apparatus may identify draggable objects (D1 to D3) depending on a characteristic of the web page. The draggable objects (D1 to D3) may be different depending on the characteristic of the web page such as text, image, video, etc. As illustrated in FIG. 5A, the draggable objects D1 to D3 may include text. For instance, draggable object D1 is an identifier associated with the web page such as a URL address, draggable object D2 is associated with a search box, and draggable object D3 includes text content associated with the web page.

FIG. 5B illustrates an example of displaying a home screen of the electronic apparatus as content. The home screen may be a background screen of the electronic apparatus.

Referring to FIG. 5B, the home screen may be configured to include three portions of content. When the electronic apparatus displays one portion S of the home screen within the display area DA of the touch panel, and the other portions R of home screen are not displayed. The objects included in the first portion home screen S may include a draggable object (D1 to D3) and a non-draggable object (ND1 to ND3). The electronic apparatus may visually differentiate the draggable objects (D1 to D3) from the non-draggable objects (ND1 to ND3) when the draggable objects (D1 to D3) are within the display area DA of the touch screen. In an exemplary embodiment, the object within the home screen may be displayed as a rectangle where each rectangle includes an icon of an application. Here, the electronic apparatus may display the edge of the draggable objects (D1 to D3) bolder than the non-draggable objects (ND1 to ND3) so that a draggable object (D1 to D3) may be visually distinguishable from a non-draggable object (ND1 to ND3).

FIG. 5C illustrates an example of displaying a screen executing a memo function as content.

Referring to FIG. 5C, when the content of a memo is large, the electronic apparatus may not display the whole memo within the display area DA of the touch screen. The portions of content of the memo displayed on the touch screen are illustrated as S and the remaining portion of the content of the memo not displayed on the touch screen is illustrated as R. The electronic apparatus may identify the draggable objects (D1 to D5) associated with the memo displayed within the display area DA of the touch screen. Here, the draggable objects (D1 to D5) may be the contents of the memo. Since the memo may be edited by a user, all of the content of memo may be the draggable objects (D1 to D5).

Figure 6A:
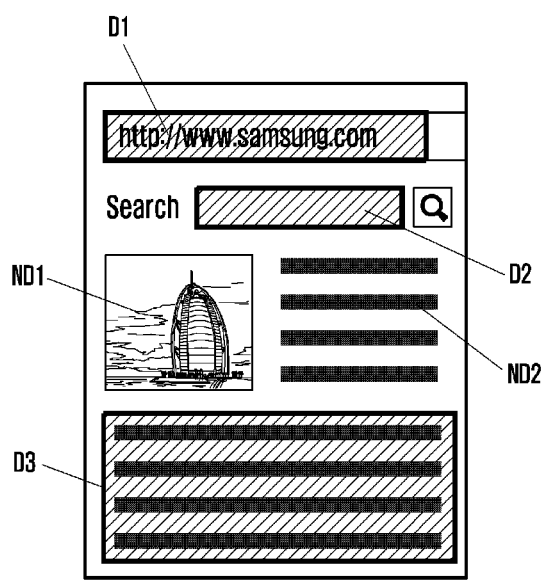
Figure 6B:
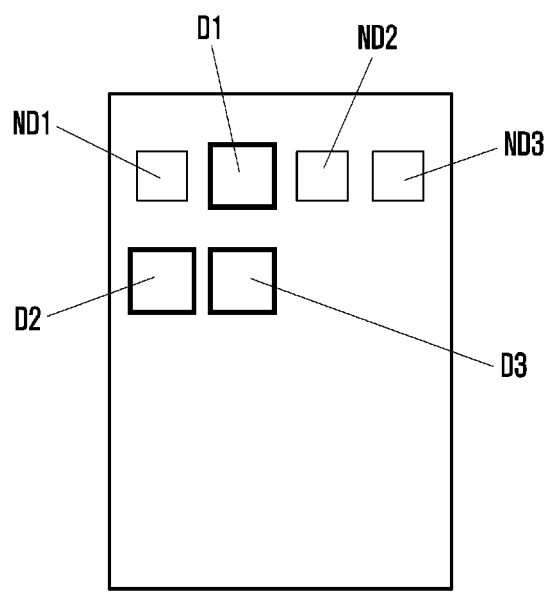

FIGS. 6A to 6C illustrate examples of displaying a draggable object discriminatively according to various embodiments of the present disclosure.

FIG. 6A illustrates an example of displaying a web page as content.

Referring to FIG. 6A, the electronic apparatus may identify the draggable objects (D1 to D3) and the non-draggable objects (ND1, ND2) displayed within the display area DA of the touch screen. The electronic apparatus may display the draggable objects (D1 to D3) such that the draggable objects (D1 to D3) are visually distinguishable from the non-draggable objects (ND1, ND2). For example, the electronic apparatus may display the draggable objects (D1 to D3) to be shaded such that the shaded draggable objects (D1 to D3) may be visually distinguishable from the non-draggable objects (ND1, ND2).

FIG. 6B illustrates an example of displaying a home screen of the electronic apparatus as content.

Referring to FIG. 6B, the electronic apparatus may identify the draggable objects (D1 to D3) and the non-draggable objects (ND1, ND2) displayed within the display area DA of the touch screen. The electronic apparatus may display the draggable objects (D1 to D3) to be larger than the non-draggable objects (ND1, ND2) such that the draggable objects (D1 to D3) may be visually distinguishable from the non-draggable objects (ND1, ND2).

FIG. 6C illustrates an example of displaying a screen executing a memo function as a content.

Referring to FIG. 6C, the electronic apparatus may display the draggable objects (D1 to D5) within the display area DA of the touch screen to be flickered where "to be flickered" may mean periodically modifying a brightness level of the display associated with the draggable objects (D1 to D5). For example, as illustrated in FIG. 6C, draggable objects (D1, D3, D5) are illustrated as having a high brightness level and draggable objects (D2, D4) are illustrated as having a low brightness level. In an exemplary embodiment, the electronic apparatus may repeatedly turn light on and off periodically to display objects to be flickered.

A user may visually recognize the draggable objects through only a screen displayed within the display area DA of the touch screen, as shown in FIGS. 6A and 6C.

Figure 7A:
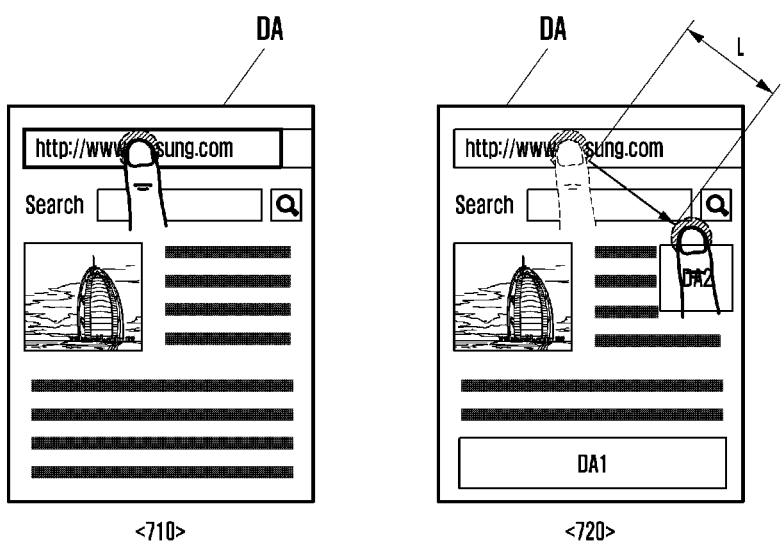
FIGS. 7A, 7B, and 7C illustrate examples of determining whether a predetermined touch input is detected according to various embodiments of the present disclosure.
Figure 7B:
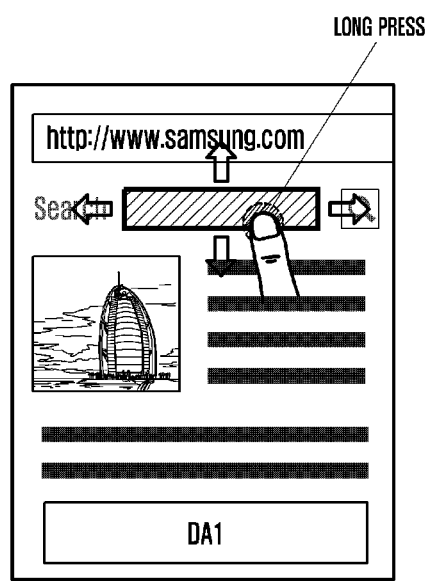
Figure 7C:
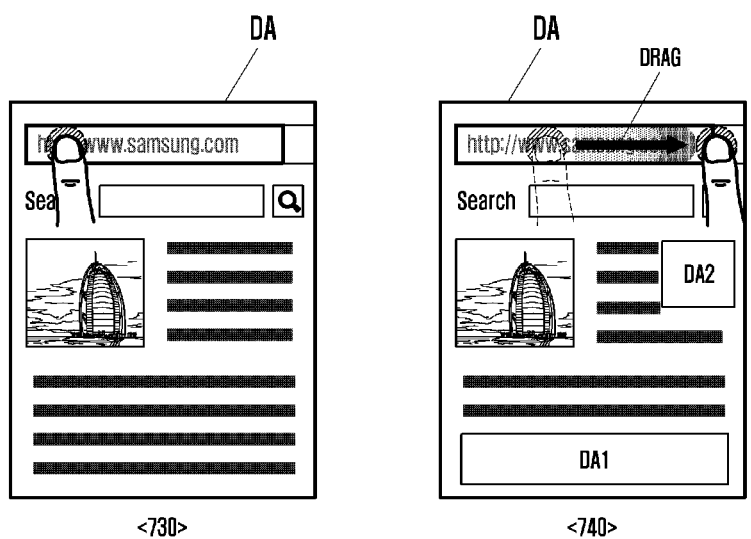

FIGS. 7A to 7C illustrates examples of determining whether a predetermined touch input is detected according to various embodiments of the present disclosure.

Referring to FIG. 7A, the electronic apparatus may determine whether a touch input associated with the identified object is maintained for a predetermined time as shown in reference numeral 710. The predetermined time may be used to determine whether the touch input is a long press, e.g., the time in which the touch input is detected exceeds two seconds. When the touch input is maintained for the predetermined time, the electronic apparatus may determine whether the touch input is dragged more than a predetermined distance L. When the touch input is dragged more than the predetermined distance L, the electronic apparatus may determine that the predetermined touch input is detected and may display the drop area indicators (DA1, DA2) within the display area DA of the touch screen. The predetermined distance L may be based on the size or the area of the touch screen. For example, the predetermined distance may be in the range of 2-5 cm. In an exemplary embodiment, a first predetermined distance such as 2-3 cm may be associated with a first touch screen and a second predetermined distance such as 3-5 cm may be associated with a second touch screen where the size or area of the second touch screen is greater than the size or area of the first touch screen.

Referring to FIG. 7B, the electronic apparatus may display that the identified object displayed within the display area DA is draggable when a detected touch input associated with the object is maintained for a predetermined time and the drag of the touch input is not detected. In an exemplary embodiment, to visually indicate an object is draggable, up, down, left, and right arrows may be display to indicate that the object can be moved to up, down, left, right. In addition, the electronic apparatus may display a drop area indicator DA1 corresponding to an intended drop area in the remaining portion of content not displayed within the display area DA of the touch screen.

Referring to FIG. 7C, the electronic apparatus may determine whether the detected touch input associated with the identified object is maintained for a predetermined time as shown in reference numeral 730. The electronic apparatus may determine whether the touch input is dragged over a predetermined speed within the display area DA, when the touch input is maintained for the predetermined time. When the touch input is dragged at the predetermined speed, the electronic apparatus may determine that the predetermined touch input is detected, and display the drop area indicators DA1, DA2 corresponding to the intended drop areas in the remaining portion of content not displayed within the display area DA of the touch screen as shown in reference numeral 740. The predetermined speed may be based on an input speed associated with a flicking input pattern.

Figure 8A:
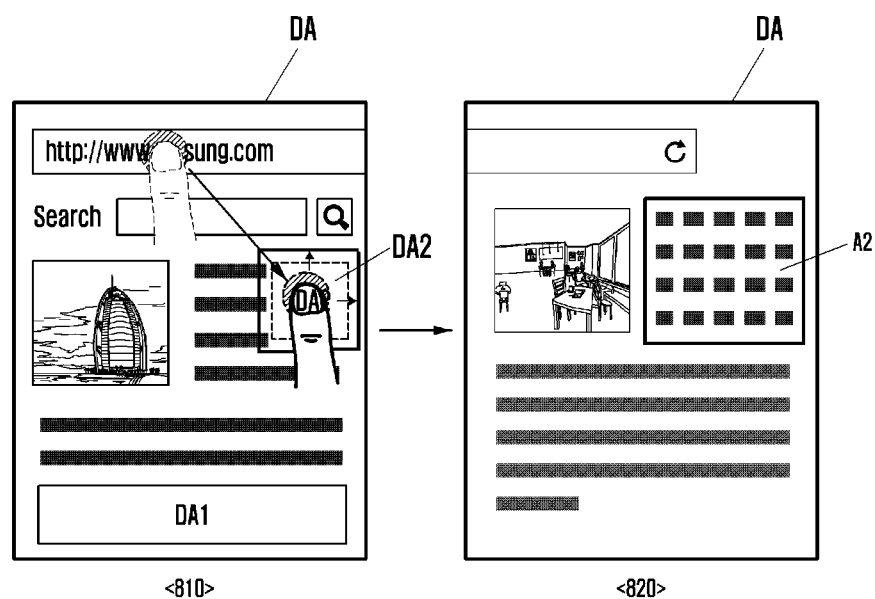
FIGS. 8A, 8B, and 8C illustrate examples of dragging an object into a drop area according to various embodiments of the present disclosure.
Figure 8B:
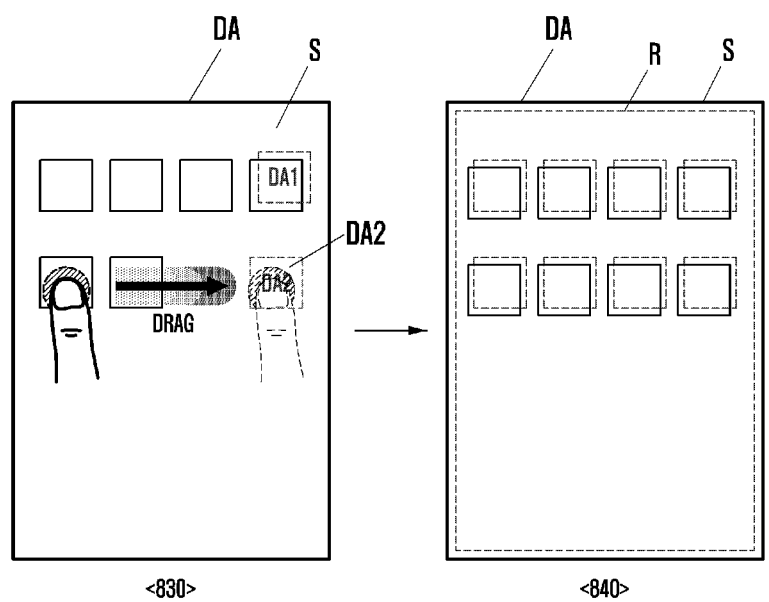
Figure 8C:
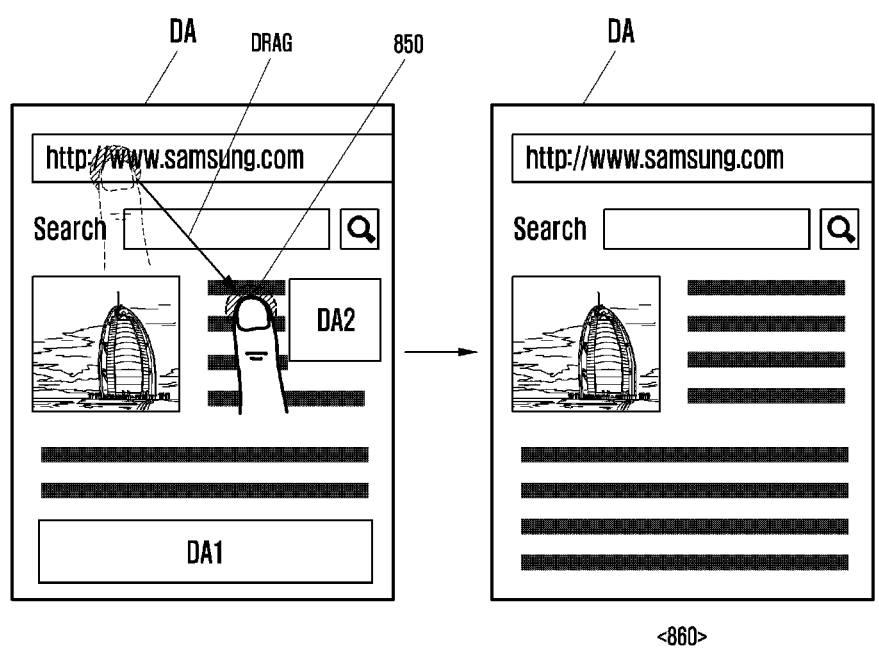

FIGS. 8A to 8C illustrate examples of dragging an object into an intended drop area according to various embodiments of the present disclosure.

Referring to FIG. 8A, when the detected touch input associated with the object is dragged to an intended drop area DA2 or a drop area indicator DA1 displayed within the display area DA, the electronic apparatus may enlarge and display the size of the intended drop area DA2 or the drop area indicator DA1 to which the object is dragged as shown in reference numeral 810. For example, the electronic apparatus may enlarge and display the size of the intended drop area DA2 to which the object is to be dragged within the display area DA such that user may visually identify the intended drop area DA2. When the object is dragged to the intended drop area DA2, the electronic apparatus may move to the remaining portion A2 of content corresponding to the intended drop area DA2 to display the remaining portion A2 of content corresponding to the intended drop area as shown in reference numeral 820. When the object is dragged to the intended drop area DA2, the electronic apparatus may automatically move to the remaining portion A2 of content corresponding to the intended drop area DA2 and display the remaining portion, thereby improving user's convenience.

Referring to FIG. 8B, when the detected touch input associated with the object is dragged to the intended drop area DA2 as shown in reference numeral 830, the electronic apparatus may display the remaining portion of content corresponding to the intended drop area IDA2 such that the dragged object overlaps the intended drop area DA2 within the display area DA of the touch screen as shown in reference numeral 840. In various embodiments of the present disclosure, when the number of the intended drop areas is more than a predetermined number, the electronic apparatus may display the remaining portion of content corresponding to the intended drop areas in an overlapping manner within the display area DA of the touch screen. When the number of the displayed intended drop areas is less than the predetermined number, the electronic apparatus may move to the remaining portion of content corresponding to the intended drop area and may display the remaining portion of content within the display area DA of the touch screen.

Referring to FIG. 8C, when the detected touch input associated with the object is dragged to an area 850 within the display area DA which is not an intended drop area, the electronic apparatus may discontinue displaying the drop area indicators DA1, DA2 on the touch screen as shown in reference numeral 860. For example, when the detected touch input associated with the object is dragged to the area 850 which is not associated with a drop area indicator DA1, DA2, the electronic apparatus may return to the state before the touch input is detected where the drop area indicators DA1, DA2 are no longer displayed.

Figure 9:
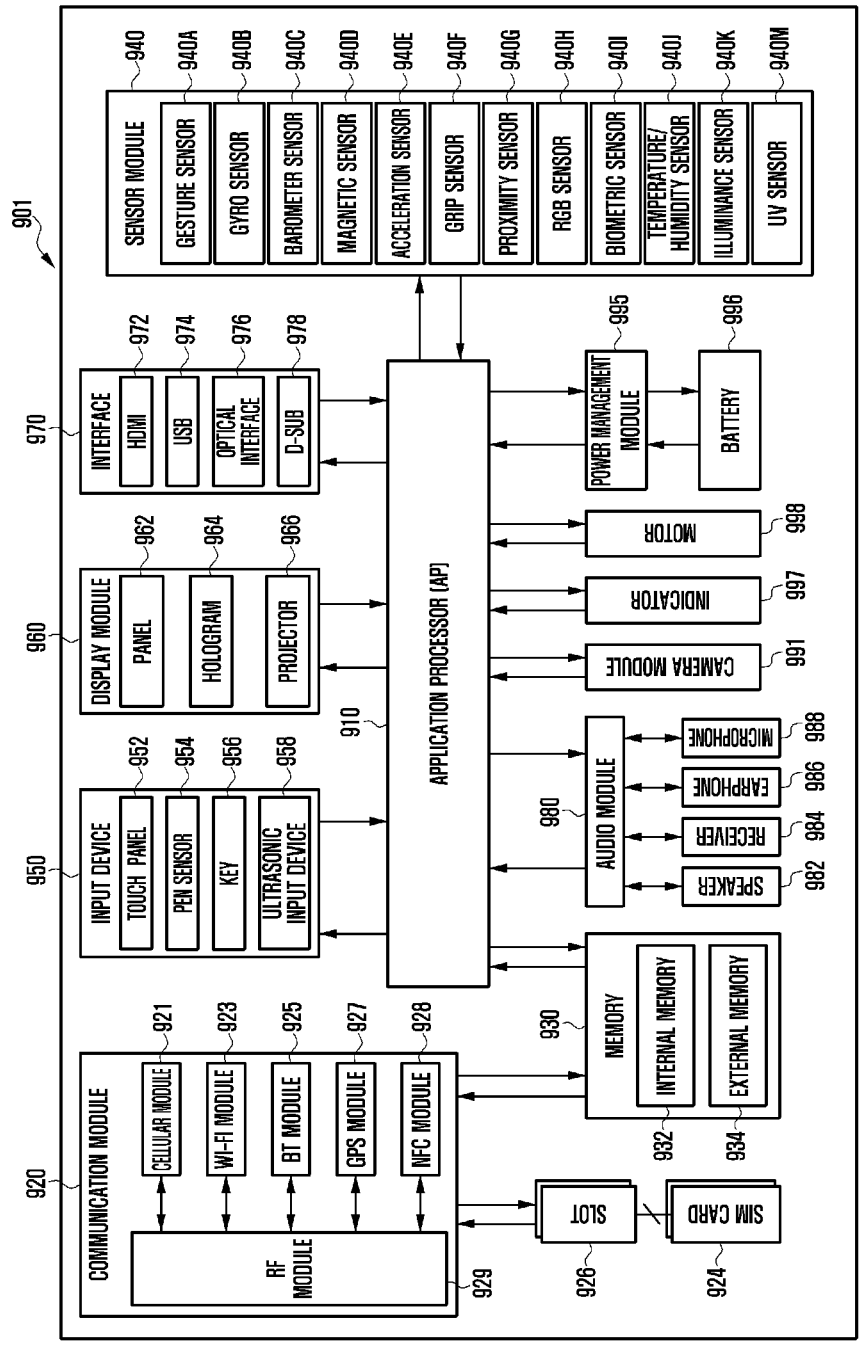
FIG. 9 is a block diagram illustrating a configuration of an electronic apparatus according to various embodiments of the present disclosure.

FIG. 9 is a block diagram of an electronic device according to various embodiments of the present disclosure.

The electronic device 901 configures all or a part of the electronic device 101 illustrated in FIG. 1.

Referring to FIG. 9, the electronic device 901 includes one or more application processors (APs) 910, a communication module 920, a subscriber identification module (SIM) card 924, a memory 930, a sensor module 940, an input device 950, a display module 960, an interface 970, an audio module 980, a camera module 991, a power-managing module 995, a battery 996, an indicator 997, and a motor 998.

The AP 910 operates an operating system (OS) or an application program so as to control a plurality of hardware or software component elements connected to the AP 910 and executes various data processing and calculations including multimedia data. The AP 910 may be implemented by a system on chip (SoC). According to an embodiment of the present disclosure, the AP 910 may further include a graphics processing unit (GPU).

The communication module 920 transmits/receives data in communication between different electronic devices such as the electronic device 104 and the server 106 connected to the electronic device 901 through a network 162. In FIG. 9, the communication module 920 includes a cellular module 921, a Wi-Fi module 923, a BT module 925, a GPS module 927, an NFC module 928, and a radio frequency (RF) module 929.

The cellular module 921 provides a voice, a call, a video call, SMS, or an Internet service through a communication network. The cellular module 921 distinguishes and authenticates electronic devices within a communication network by using a SIM card 924. According to an embodiment of the present disclosure, the cellular module 921 performs at least some of the functions that can be provided by the AP 910, such as the multimedia control functions.

According to an embodiment of the present disclosure, the cellular module 921 includes a communication processor (CP). The cellular module 921 may be implemented by, for example, an SoC. Although the components such as the cellular module 921, the memory 930, and the power-managing module 995 are illustrated as components separate from the AP 910 in FIG. 9, the AP 910 includes at least some of the aforementioned components.

According to an embodiment of the present disclosure, the AP 910 or the cellular module 921 loads a command or data received from at least one of a non-volatile memory and other components connected to each of the AP 910 and the cellular module 921 to a volatile memory and processes the loaded command or data. The AP 910 or the cellular module 921 stores data received from at least one of other components or generated by at least one of other components in a non-volatile memory.

Each of the Wi-Fi module 923, the BT module 925, the GPS module 927, and the NFC module 928 includes, for example, a processor for processing data transmitted/received through the corresponding module. Although the cellular module 921, the Wi-Fi module 923, the BT module 925, the GPS module 927, and the NFC module 928 are illustrated as blocks separate from each other in FIG. 9, at least two of the cellular module 921, the Wi-Fi module 923, the BT module 925, the GPS module 927, and the NFC module 928 may be included in one integrated chip (IC) or one IC package according to an embodiment of the present disclosure. For example, at least some of the processors corresponding to the cellular module 921, the Wi-Fi module 923, the BT module 925, the GPS module 927, and the NFC module 928 may be implemented by one SoC.

The RF module 929 transmits/receives data such as an RF signal. The RF module 929 includes, for example, a transceiver, a power amp module (PAM), a frequency filter, and a low noise amplifier (LNA). The RF module 929 may further include a component for transmitting/receiving electronic waves over a free air space in wireless communication, such as a conductor or a conducting wire. Although the cellular module 921, the Wi-Fi module 923, the BT module 925, the GPS module 927, and the NFC module 928 share one RF module 929 in FIG. 9, at least one of the modules may transmit/receive an RF signal through a separate RF module according to an embodiment of the present disclosure.

The SIM card 924 is inserted into a slot 926 formed in a particular portion of the electronic device, and includes unique identification information such as an integrated circuit card identifier (ICCID) or subscriber information such as an international mobile subscriber identity (IMSI).

The memory 930 includes an internal memory 932 or an external memory 934. The internal memory 932 includes, for example, at least one of a volatile memory such as a random access memory (RAM), a dynamic RAM (DRAM), a static RAM (SRAM), and a synchronous DRAM (SDRAM), and a non-volatile Memory such as a read only memory (ROM), a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, and a NOR flash memory.

According to an embodiment of the present disclosure, the internal memory 932 may be a solid state drive (SSD). The external memory 934 may further include a flash drive such as a compact flash (CF), a secure digital (SD), a Micro-SD, a Mini-SD, an extreme digital (xD), or a memory stick. The external memory 934 may be functionally connected to the electronic device 901 through various interfaces. According to an embodiment of the present disclosure, the electronic device 901 may further include a storage device such as a hard drive.

The sensor module 940 measures a physical quantity or detects an operation state of the electronic device 101, and converts the measured or detected information to an electronic signal. The sensor module 940 includes a gesture sensor 940A, a gyro sensor 940B, an atmospheric pressure (barometric) sensor 940C, a magnetic sensor 940D, an acceleration sensor 940E, a grip sensor 940F, a proximity sensor 940G, a color sensor 940H (for example, red, green, and blue (RGB) sensor) 1140H, a biometric sensor 940I, a temperature/humidity sensor 940J, an illumination (light) sensor 940K, and an ultraviolet (UV) sensor 940M.

Additionally or alternatively, the sensor module 940 may include an E-nose sensor, an electromyography (EMG) sensor, an electroencephalogram (EEG) sensor, an electrocardiogram (ECG) sensor, an infrared (IR) sensor, an iris sensor, and a fingerprint sensor (not illustrated). The sensor module 940 may further include a control circuit for controlling one or more sensors included in the sensor module 940.

The input device 950 includes a touch panel 952, a (digital) pen sensor 954, a key 956, and an ultrasonic input device 958. For example, the touch panel 952 recognizes a touch input in at least one of a capacitive, resistive, infrared, and acoustic wave type. The touch panel 952 may further include a control circuit. In the capacitive type, the touch panel 952 can recognize proximity as well as a direct touch. The touch panel 952 may further include a tactile layer that provides a tactile reaction to the user.

The (digital) pen sensor 954 may be implemented, for example, using a method identical or similar to a method of receiving a touch input of the user, or using a separate recognition sheet. The key 956 includes, for example, a physical button, an optical key, or a key pad. The ultrasonic input device 958 detects an acoustic wave by a microphone 988 of the electronic device 901 through an input means generating an ultrasonic signal to identify data and performs wireless recognition.

The display 960 (for example, display 150) includes a panel 962, a hologram device 964, and a projector 966. The panel 962 may be, for example, a liquid crystal display (LCD) or an active matrix organic light emitting diode (AM-OLED). The panel 962 may be implemented to be, for example, flexible, transparent, or wearable. The panel 962 may be configured by the touch panel 952 and one module. The hologram device 964 shows a stereoscopic image in the air by using interference of light. The projector 966 projects light on a screen to display an image. For example, the screen may be located inside or outside the electronic device 901. According to an embodiment of the present disclosure, the display 960 may further include a control circuit for controlling the panel 962, the hologram device 964, and the projector 966.

The interface 970 includes, for example, an HDMI 972, a USB 974, an optical interface 976, and a D-subminiature (D-sub) 978. The interface 970 may be included in, for example, the communication interface 160 illustrated in FIG. 1. Additionally or alternatively, the interface 970 may include, for example, a mobile high-definition link (MHL) interface, an SD card/multi-media card (MMC), or an infrared data association (IrDA) standard interface.

The audio module 980 bi-directionally converts a sound and an electronic signal. At least some components of the audio module 980 may be included in, for example, the input/output interface 140 illustrated in FIG. 1. The audio module 980 processes sound information input or output through, for example, a speaker 982, a receiver 984, an earphone 986, the microphone 988 or the like.

The camera module 991 is a device which can photograph a still image and a video. According to an embodiment of the present disclosure, the camera module 991 may include one or more image sensors (for example, a front sensor or a back sensor), an image signal processor (ISP) (not shown) or a flash (for example, an LED or xenon lamp).

The power managing module 995 manages power of the electronic device 901. Although not illustrated, the power managing module 995 may include, for example, a power management integrated circuit (PMIC), a charger IC, or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment of the present disclosure, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 996, or a voltage, a current, or a temperature during charging. The battery 996 may store or generate electricity and supply power to the electronic device 901 by using the stored or generated electricity. The battery 996 may include a rechargeable battery or a solar battery.

The indicator 997 shows particular statuses of the electronic device 901 or a part (for example, AP 910) of the electronic device 901, for example, a booting status, a message status, a charging status and the like. The motor 998 converts an electrical signal to a mechanical vibration. Although not illustrated, the electronic device 901 may include a processing unit (for example, GPU) for supporting a module TV. The processing unit for supporting the mobile TV may process, for example, media data according to a standard of digital multimedia broadcasting (DMB), digital video broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
    a touch screen configured to display at least part of a content, wherein a display area of the content is larger than a display area of the touch screen; and
    at least one processor configured to:
        display a first portion of the content on the touch screen without displaying a second portion of the content, the second portion of the content being a remaining portion of the content except the first portion,
        identify an object in the content as a draggable object,
        determine whether a predetermined touch input associated with the identified object is detected,
        when the predetermined touch input is detected, determine whether one or more intended drop areas associated with the identified object exists in the second portion of the content, and
        control the touch screen to display, when a plurality of intended drop areas are associated with the identified object, a plurality of drop area indicators corresponding to the intended drop areas on the touch screen by overlaying the drop area indicators on the first portion of the content.

2. The electronic apparatus of claim 1, wherein the at least one processor is further configured to identify the object as the draggable object from among a plurality of objects displayed on the touch screen.

3. The electronic apparatus of claim 1, wherein the at least one processor is further configured to:
    determine whether the touch input associated with the identified object is maintained for a predetermined time,
    when the touch input is maintained for the predetermined time, determine whether the touch input is dragged more than at least one of a predetermined distance or a predetermined speed, and
    when the touch input is dragged more than the predetermined distance or over the predetermined speed, determine that the predetermined touch input is detected.

4. The electronic apparatus of claim 3, wherein the at least one processor is further configured to, when the touch input detected on the identified object is maintained for the predetermined time and the drag of the touch input is not detected, control the touch screen to visually indicate that the identified object is draggable.

5. The electronic apparatus of claim 1, wherein the at least one processor is further configured to:
    identify a non-draggable object displayed on the touch screen, and
    display the draggable object to be distinguished from the non-draggable object.

6. The electronic apparatus of claim 1, wherein the at least one processor is further configured to:
    determine at least one of a number, a location, or a size of the intended drop areas,
    adjust at least one of the number, the location, or the size of the drop area indicators to correspond to at least one of the determined number, location, or size of the intended drop areas, and
    display the adjusted drop area indicators on the touch screen.

7. The electronic apparatus of claim 1, wherein the at least one processor is further configured to display a path from the object in which the touch input is detected to the intended drop areas as a guide line.

8. The electronic apparatus of claim 1, wherein the touch screen is further configured to, when the touch input detected on the object is dragged to a drop area indicator, enlarge and display a size of an intended drop area to which the object is dragged.

9. The electronic apparatus of claim 1, wherein the at least one processor is further configured to:
    when the touch input associated with the object is dragged to a drop area indicator, move to the second portion of the content corresponding to an intended drop area, and display the second portion of the content corresponding to the intended drop area on the touch screen.

10. The electronic apparatus of claim 1, wherein the at least one processor is further configured to, when the touch input associated with the object is dragged to a drop area indicator, display the second portion of the content corresponding to an intended drop area overlapping with the touch screen.

11. The electronic apparatus of claim 10, wherein the at least one processor is further configured to, when a number of drop area indicators is more than a predetermined number, display the second portion of the content corresponding to an intended drop area overlapping with the touch screen.

12. The electronic apparatus of claim 1, wherein the at least one processor is further configured to, when the touch input associated with the object is dragged to an area which is not associated with a drop area indicator, remove the drop area indicators from the touch screen.

13. A method of processing a drag and a drop in an electronic apparatus having a touch screen, the method comprising:
    displaying a first portion of a content on the touch screen without displaying a second portion of the content, the second portion of the content being a remaining portion of the content except the first portion, wherein a display area of the content is larger than a display area of the touch screen;
    identifying an object in the content as a draggable object;
    determining whether a predetermined touch input associated with the identified object is detected;
    when the predetermined touch input is detected, determining whether one or more intended drop areas associated with the identified object exists in the second portion of the content; and
    displaying, when a plurality of intended drop areas are associated with the identified object, a plurality of drop area indicators corresponding to the intended drop areas on the touch screen by overlaying the drop area indicators on the first portion of the content.

14. The method of claim 13, wherein the identifying of the object as the draggable object comprises identifying the object from among a plurality of objects displayed on the touch screen.

15. The method of claim 13, wherein the determining of whether a predetermined touch input is detected comprises:
    determining whether the touch input associated with the identified object is maintained for a predetermined time;
    when the touch input is maintained for the predetermined time, determining whether the touch input is dragged more than at least one of a predetermined distance or a predetermined speed; and
    when the touch input is dragged more than the predetermined distance or over the predetermined speed, determining that the predetermined touch input is detected.

16. The method of claim 13, wherein the determining of whether the intended drop areas associated with the identified object exists comprises:
    determining at least one of a number, a location, or a size of the intended drop areas;
    displaying a drop area indicator corresponding to each detected intended drop area;
    adjusting at least one of a number, a location, or a size of the drop area indicators to correspond to at least one of the determined number, the location, or the size; and
    displaying the adjusted drop area indicators on the touch screen.

17. The method of claim 13, wherein the displaying of the drop area indicators comprises displaying a path from the object in which the touch input is detected to the drop area indicators on the touch screen as a guide line.

18. The method of claim 13, further comprising, when the touch input associated with the object is dragged to a drop area indicator, enlarging and displaying a size of an intended drop area to which the object is dragged.

19. The method of claim 13, further comprising:
    when the touch input associated with the object is dragged to a drop area indicator, moving to the second portion of the content corresponding to an intended drop area; and
    displaying the second portion of the content corresponding to the intended drop area on the touch screen.

20. The method of claim 13, further comprising, when the touch input associated with the object is dragged to a drop area indicator, displaying the second portion of the content corresponding to an intended drop area to overlap with the touch screen.

* * * * *